US010917738B2

(12) United States Patent
Hegstad et al.

(10) Patent No.: US 10,917,738 B2
(45) Date of Patent: Feb. 9, 2021

(54) SYSTEMS AND METHODS FOR PROVIDING MOBILE PROVING GROUND

(71) Applicant: Capital One Services, LLC, McLean, VA (US)

(72) Inventors: Kjell Hegstad, Garnett Valley, PA (US); Dennis Brandt, Wilmington, DE (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/377,106

(22) Filed: Apr. 5, 2019

(65) Prior Publication Data

US 2019/0239023 A1 Aug. 1, 2019

Related U.S. Application Data

(63) Continuation of application No. 14/324,639, filed on Jul. 7, 2014, now Pat. No. 10,299,066.

(60) Provisional application No. 61/843,715, filed on Jul. 8, 2013.

(51) Int. Cl.
| | |
|---|---|
| *H04W 4/00* | (2018.01) |
| *G06F 11/36* | (2006.01) |
| *H04W 4/21* | (2018.01) |
| *H04W 4/60* | (2018.01) |

(52) U.S. Cl.
CPC .......... *H04W 4/00* (2013.01); *G06F 11/3688* (2013.01); *H04W 4/21* (2018.02); *H04W 4/60* (2018.02)

(58) Field of Classification Search
CPC ... H04L 29/06; H04L 29/08072; G06Q 10/10; G06F 3/0481; G06F 3/0482
See application file for complete search history.

(56) References Cited

U.S. PATENT DOCUMENTS

| | | |
|---|---|---|
| 8,341,529 B1 | 12/2012 | Li et al. |
| 2002/0138543 A1 | 9/2002 | Teng et al. |
| 2003/0037263 A1 | 2/2003 | Kamat et al. |
| 2004/0034646 A1 | 2/2004 | Kimball et al. |
| 2005/0026131 A1* | 2/2005 | Elzinga .................... G09B 5/00 434/365 |
| 2007/0096894 A1* | 5/2007 | Lemmon ................. G08B 27/00 340/506 |
| 2009/0254859 A1 | 10/2009 | Arrasvuori et al. |
| 2009/0292680 A1 | 11/2009 | Sabnani |
| 2010/0251187 A1 | 9/2010 | Tseng et al. |

(Continued)

*Primary Examiner* — Toan H Vu
(74) *Attorney, Agent, or Firm* — Pillsbury Winthrop Shaw Pittman LLP

(57) ABSTRACT

The disclosed embodiments include methods, systems, and articles of manufacture for enabling beta testing of new features within a native application. In one embodiment, a native application executed by a client device may include executable instructions that are activated and executed only upon indication of a user belonging to a beta test group. The client device may receive a signal from a service or content provider that includes test group information indicating whether a user is a member of a test group. The client device may process the received signal to determine whether the user is a member of a test group and, if so, activates and executes certain instructions received as part of the native application that define a user interface enabling access to additional functionality unavailable to a user determined not to be a member of a test group.

17 Claims, 9 Drawing Sheets

(56) References Cited

U.S. PATENT DOCUMENTS

| | | |
|---|---|---|
| 2010/0325560 A1 | 12/2010 | Bryan |
| 2011/0119598 A1* | 5/2011 | Traylor .................. H04W 4/08 715/753 |
| 2011/0225034 A1* | 9/2011 | Bayat .................... G06Q 30/02 705/14.36 |
| 2011/0302211 A1 | 12/2011 | Kilday et al. |
| 2012/0094721 A1 | 4/2012 | Brondmo et al. |
| 2013/0029641 A1 | 1/2013 | Hickie |
| 2013/0066962 A1 | 3/2013 | Scherzinger et al. |
| 2013/0151374 A1* | 6/2013 | Sims ................. G06Q 30/0609 705/26.35 |
| 2013/0184059 A1 | 7/2013 | Costello et al. |
| 2013/0198119 A1* | 8/2013 | Eberhardt, III ........ G06N 7/005 706/12 |
| 2013/0232201 A1* | 9/2013 | Jennings ................ H04L 67/24 709/204 |
| 2013/0246908 A1 | 9/2013 | Buehler et al. |
| 2013/0297406 A1 | 11/2013 | Bhatia et al. |
| 2014/0075336 A1* | 3/2014 | Curtis .................... G06N 20/00 715/753 |
| 2014/0095629 A1 | 4/2014 | Brown et al. |
| 2014/0096270 A1 | 4/2014 | Beckwith et al. |
| 2014/0108333 A1* | 4/2014 | Jain ........................ H04L 67/22 707/609 |
| 2014/0280540 A1* | 9/2014 | Wurtele ................ H04L 65/403 709/204 |
| 2014/0282016 A1 | 9/2014 | Hosier, Jr. |
| 2014/0317179 A1 | 10/2014 | Barman et al. |
| 2014/0337465 A1* | 11/2014 | Everitt .................... H04L 67/34 709/217 |
| 2014/0344550 A1 | 11/2014 | Kruglick |
| 2015/0207824 A1 | 7/2015 | Sathish et al. |
| 2016/0034936 A1 | 2/2016 | Bryant, III et al. |

* cited by examiner

SYSTEMS AND METHODS FOR PROVIDING MOBILE PROVING GROUND

PRIORITY CLAIM

This application is a continuation of U.S. Application Ser. No. 14/324,639, filed Jul. 7, 2014, which claims priority under 35 U.S.C. § 119 to U.S. Provisional Patent Application No. 61/843,715, filed on Jul. 8, 2013, the contents of both of which are expressly incorporated herein by reference in its entirety their entireties.

TECHNICAL FIELD

The present disclosure relates generally to systems and methods for mobile proving grounds. More particularly, and without limitation, the present disclosure relates to systems and methods for providing a user interface in a mobile application that allows a set of users to test, in real-time, new or modified features and functionality of the mobile application within the native mobile application.

BACKGROUND

The prevalence of mobile technologies such as smart phones, tablets, and other electronic mobile wireless devices has driven the proliferation of mobile applications (or "apps") that enable diverse functionality of these devices. As the use of smart phones, tablets, and other electronic mobile devices becomes even more widespread, it becomes increasingly important to provide a convenient and enriching experience to clients and consumers of businesses, institutions, and other content or service providers ("providers") through a well-designed app. For example, users may opt to transact with one provider over another based on the convenience and functionality of that provider's app. With respect to a financial services provider, the particular functionality of a mobile app can eliminate the need for some users to visit a brick-and-mortar location for routine transactions.

As users continue to increasingly rely on the functionality of mobile applications for their service and content needs, providers are challenged with identifying the usefulness and desirability of particular features to incorporate into their mobile app. Additionally, providers strive to identify how users interact with the mobile app and to what extent additional or modified functionality can lead to increased revenues from existing clients and/or attract new clients. In particular, providers desire a way to efficiently and effectively test the use and desirability of new features in a mobile app by evaluating real-time interactions of a large number of users according to their actual typical use of the mobile app.

Conventional testing methods include traditional surveying actual or potential users of a mobile app regarding the desirability of particular functionality and how that functionality might be used. Traditional surveys, however, may not be very accurate in predicting how users will utilize that feature within the actual working (or "native") mobile app that is available for all users. Thus, real-time beta testing of a native app with the new features and functionality is more desirable. Conventional beta testing methods, however, are incapable of effectively testing the new features and functionality among a large group of actual users. A provider typically must provide a beta version of its mobile app (a "beta app") to a mobile app distributor, such as the Apple App Store® or Google Play®, where select users may be instructed to download the beta app. But mobile app distributors often limit the number of versions of a particular app that are available for download. Accordingly, a provider typically must include all new features or functionality it is testing within the beta app. Mobile app distributers also limit the number of users that can download the beta app. Thus, conventional beta testing of new mobile app functionality typically suffers from being unable to release multiple versions of a beta app to test specific new features and functionality or to reach large numbers of users that may have diverse demographics and varying levels of interaction with the mobile app.

Typical beta testing methods also fail because they require select users to download a beta version of the mobile app for each newly planned feature, which many of these select users may neglect or be reluctant to do. Additionally, some users may find that the beta app includes new functionality that is undesirable or results in a negative experience, requiring that user to once again download another version of the mobile app, such as the native app. Thus, it is desirable to enable beta testing of new features for select users within the native app. Additionally, it is desirable to implement a method and system to dynamically control the availability of new discreet features (beta features) of the mobile app to select users, without requiring separate downloading of new versions of the mobile app for each beta feature.

SUMMARY

Disclosed embodiments include methods, systems, and computer-readable media configured to, for example, provide a user interface in a native mobile application to a set of users for testing new features and functionality of the mobile application. For example, a mobile device is disclosed for providing a user interface on a mobile application, comprising at least one processor and at least one memory device that stores a set of instructions corresponding to the mobile application. When executed by the processor, the stored instructions may cause the processor to receive a signal from a service provider, the signal including information indicating test group membership data. The mobile device may also be configured to determine, based on at least the received signal, whether the user is a member of a test group and enable access to a first set of functions in the mobile application after the user is determined to be one of the members of the test group. The first set of functions may unavailable to non-members of the test group. The mobile device may also be configured to display a user interface including at least one feature from the first set of functions on the mobile application.

In one aspect, the disclosed embodiments include a method for providing a user interface on a device. The method may include receiving a communication signal including at least test group identification information for a user associated with the device. The method may also include identifying whether the test group identification information indicates the user is a member of at least one test group, and executing a first set of instructions after the user is identified as a member of a test group associated with the first set of functions, and a second set of instructions when the user is identified as not a member of the test group. The method may also include displaying a user interface according to the execution of the first or second set of instructions, wherein the first set of instructions enable access to at least one or more test functions that are un-available to a user that is not a member of a test group.

Aspects of the disclosed embodiments may include tangible computer-readable media that stores software instructions that, when executed by one or more processors, are configured to and capable of performing and executing one or more of the methods, operations, and the like consistent with the disclosed embodiments. Also, aspects of the disclosed embodiments may be performed by one or more processors, that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
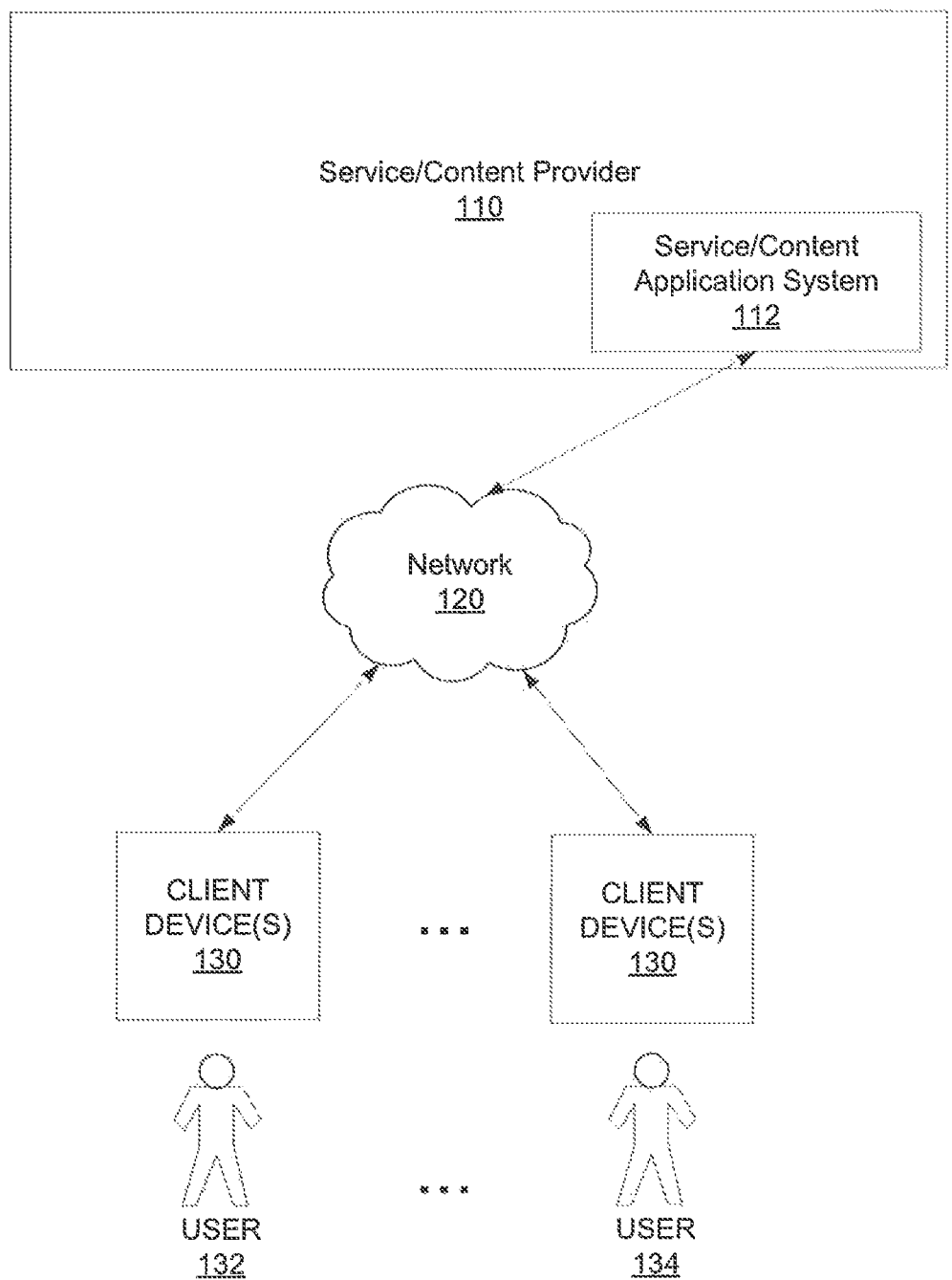
FIG. 1 is a block diagram of an exemplary system, consistent with disclosed embodiments.

FIG. 1 is a block diagram of an exemplary system 100 for performing one or more operations consistent with the disclosed embodiments. As further disclosed herein, system 100 may be used for providing a user interface in a native mobile application to a set of users for testing new features and functionality of the mobile application. In one embodiment, system 100 may include one or more service or content application system(s) 112 ("application system") interconnected via a network 120 to one or more client devices 130. Application system 112 may be one of many systems controlled, operated, or utilized by a service or content provider 110 ("provider"). In other embodiments, application system 112 is a separate and distinct system from service or content provider 110. System 100 may include other components or subsystems that perform or assist in the performance of one or more processes consistent with the disclosed embodiments as would be understood by one of ordinary skill in the art.

As will be described in more detail below, in certain embodiments, one or more components of system 100 may be configured to select one or more, or a subset of, users 132 to join a beta test group for testing new features and functionality of a mobile application. Such select users may be designated as beta users 134. System 100 may notify the beta users 134 of the availability to join the beta test group. In some embodiments, system 100 may notify the beta users 134 via, for example, client device 130, personal computer, telephone, traditional mail, or other communication medium. System 100 may receive enrollment information from at least one beta user 134 for enrolling in the beta test group and may store that information or otherwise update information in a database related to the beta testing of new or updated mobile application features. System 100 may enable users 132 and 134 to download and execute a native mobile application on client devices 130. Upon execution of the application, system 100 may receive user information from a user (via, e.g., client device 130) and determine whether the user is one of beta users 134. System 100 may then transmit information to client device 130 indicating whether the user is one of beta users 134 via an application signal, e.g. a signal including a software command, program variable setting, etc. Client device 130 may determine whether the signal information indicates that the user is one of beta users 134. If the user executing the application is one of beta users 134, client device 130 may display one or more beta features for testing on a user interface of the native application. If the user executing the application is not one of beta users 134, i.e., user 132, client device 130 may display the normal or current features of the native mobile application.

In an exemplary embodiment, provider 110 corresponds to a business, merchant, or entity that provides goods, services, and/or information content, such as a retailer, grocery store, service provider (e.g., utility company, etc.), non-profit organization, content provider (whether offline or online), or any other type of entity that provides goods, services, and/or information that consumers (i.e., end-users or other business entitles) may purchase, consume, use, etc. Provider 110 is not limited to entities that conduct business in any particular industry or field.

Provider 110 may be associated with a merchant brick-and-mortar location(s) that a consumer (e.g., users 132, 134) may visit in person and purchase and/or receive goods and services. Such physical locations may include computing devices that perform financial service transactions with consumers (e.g., Point-of-Sale (POS) terminal(s), kiosks, etc.). According to some embodiments, provider 110 may perform financial transactions, e.g., purchase transactions, with users 132, 134 (via, e.g., client device 130 operate by users 132, 134). Provider 110 may also include back and/or front-end computing components that store data and execute software instructions to perform operations consistent with disclosed embodiments, independent of or in conjunction with application system 112.

Provider 110 may also be associated with a merchant that provides goods or services via online or e-commerce solutions. For example, provider 110 may be a merchant selling goods via a website using known online or e-commerce systems and solutions to market, sell and process online transactions. Provider 110 may also provide such services through a mobile application, such as a native mobile app operating on client device 130, which may communicate with application system 112 via network 120.

In an exemplary embodiment, provider 110 may correspond to a financial services provider. For example, the financial services provider may be associated with a bank, stock broker, fund manager, credit card issuer, or other type of financial services entity or institution that generates, provides, manages, and/or maintains financial service accounts for one or more users. Financial service accounts may include, for example, credit card accounts, loan accounts, checking accounts, savings accounts, stock accounts, reward or loyalty program accounts, and/or any other type of financial service account known to those skilled in the art. The financial services provider is capable of providing such services through a mobile application, such as a native mobile app operating on client device 130 that communicates with application system 112 via network 120. In this embodiment, financial service provider 110 may also include one or more physical locations and the infrastructure and systems configured to generate and/or provide the desired financial services.

In another embodiment, provider 110 may be a system associated with an entity providing content, which is viewed, listened to, or otherwise consumed by users. For example, provider 110 may be associated with a broadcasting network, radio network, website, news service, social network, digital media source, or other type of entity that generates, provides, manages, distributes, and/or delivers content (whether offline or online) to others. For instance, as non-limiting examples, provider 110 may be associated with a television network, cable company, radio service, news service, or digital media source. Provider 110 may deliver to client device 130, via network 120, dynamic media content (i.e., video, audio, interactive content, etc.) and/or static content (digital print media, images, etc.). The content delivered to client device 130 may be provided to a user 132, 134 through an application operating on the client device, such as a native application or a web browser operating on client device 130, which communicates with application system 112 via network 120. Provider 110 may further include additional infrastructure and systems configured to generate, provide, manage, distribute, and/or deliver content. As noted above, however, provider 110 is not limited to entities that conduct business in any particular industry or field.

Application system 112 may include a number of computing systems configured to provide services or content to users 132, 134 via network 120 and client device 130 according to the disclosed embodiments. As further described herein, components of application system 112 may include one or more computing devices (e.g., computer(s), server(s), processor(s) etc.), memory systems for storing data and content, and/or software instructions (e.g., database(s), memory devices, etc.), and other known computing components. In some embodiments, the one or more computing devices are configured to execute software instructions stored on one or more memory devices to perform one or more operations consistent with the disclosed embodiments. Although computing devices operating according to disclosed embodiments may be implemented as computer processing instructions, all or a portion of the functionality of the computing devices may be implemented instead in electronics hardware. The components of application system 112 may be provided in a single location or distributed across a number of locations interconnected via one or more networks. Additionally, application system 112 may be directly or indirectly controlled or operated by provider 110, or may be part of a third party system on behalf of provider 110. In some embodiments, one or more aspects or components of application system 112 may be operated or controlled by provider 110, whereas other aspects and components are operated or controlled by a third party.

Network 120 may be any type of network configured to provide communications between components of system 100. For example, network 120 may be any type of network or combination of networks that provides communications, exchanges information, and/or facilitates the exchange of information, such as the Internet, a Local Area Network, a Wide Area Network, a wired or wireless network, a cellular network, or other suitable connection(s) and infrastructure that enables the sending and receiving of information between the components of system 100. The disclosed embodiments are not limited to any particular configuration of network 120.

Client device(s) 130 may be one or more computing devices configured to perform one or more operations consistent with the disclosed embodiments. In an exemplary embodiment, client device 130 may be a mobile device (e.g., tablet, smartphone, personal digital assistant (PDA), e-reader, iPad®, iPod®, etc.). Disclosed embodiments, however, are not limited to any particular configuration of client device 130. As such, client device 130 may be a desktop computer, a laptop, smart television or any other type of computing device or any other device capable of presenting content or displaying a user interface to user 132 for receiving a service or content via network 120. According to some embodiments, client device 130 may comprise a network-enabled computing device operably connected to one or more other presentation devices, which may themselves constitute client devices 130.

Figure 2:
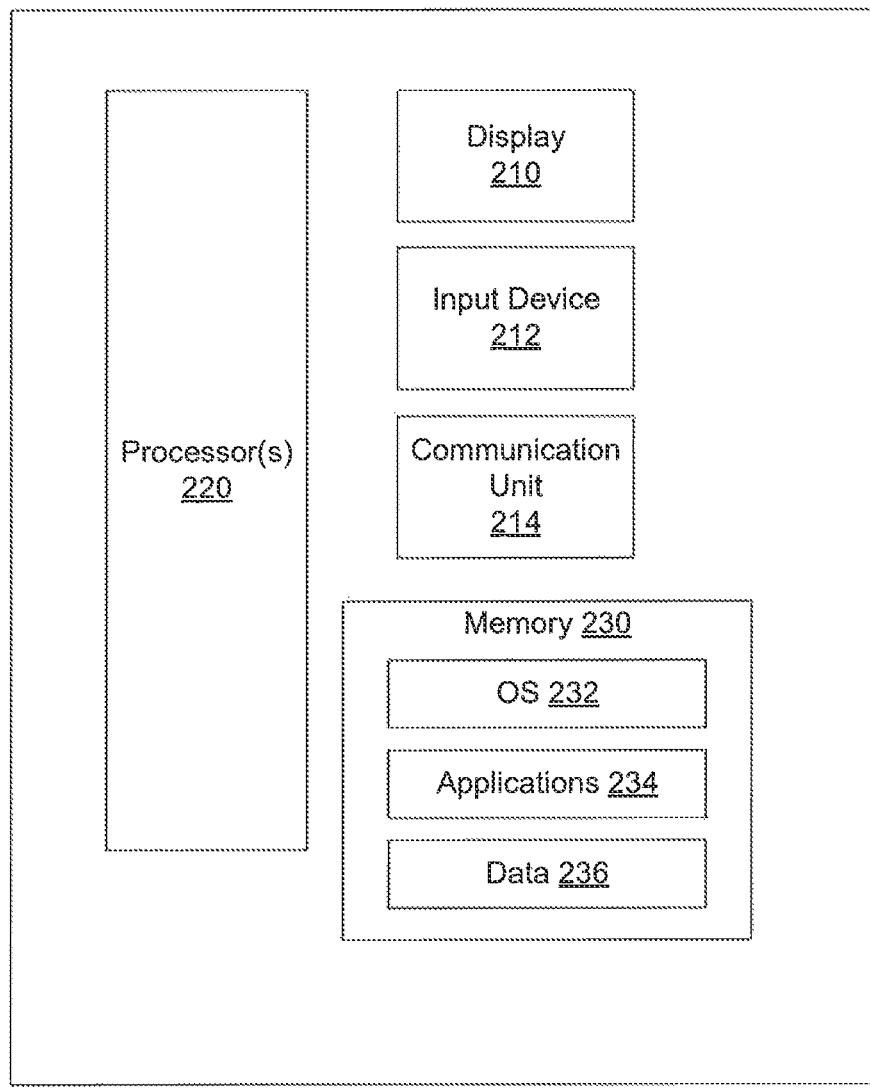
FIG. 2 is a block diagram of an exemplary client device system, consistent with disclosed embodiments.

As shown in FIG. 2, client device 130 may include one or more controllers or processors 220, which may include one or more microprocessors configured to control the operation of client device 130 according to the disclosed embodiments. Processor 220 may be configured to interact with a number of device subsystems, such as display 210, input device 212, communication unit 214, and memory unit 230. Client device 130 is not limited to the particular components or subsystems illustrated in FIG. 2, and may include any number of additional subsystems or arrangements of subsystems for performing the operations of client device 130 consistent with the disclosed embodiments.

In an exemplary embodiment, display 210 may comprise a screen for displaying content or providing a user interface. Display 210 may include a visible screen realized by underlying LED-backlit LCD technology, organic LED technology, electronic ink, or any other suitable display technology according to the disclosed embodiments. In some embodiments, display 210 may be an external component in communication with client device 130 for displaying content or a user interface consistent with the disclosed embodiments. Input device 212 may incorporate a keyboard realized using hardware or software, one or more buttons, a stylus, a trackball or any other input device for enabling input or control by user 132. In some embodiments, input device 212 may be provided as part of display 210, such as through a touch-sensitive input surface or touch-screen or any other method of recognizing user input via display 210.

Communication unit 214 may include one or more communication systems suitable for communicating via network 120. The particular design of communication unit 214 depends on the configuration of network 120, through which client device 130 is capable of communicating with application system 112. In the disclosed embodiments, client device 130 is capable of sending and receiving communication signals over a plurality and/or combination of network configurations, such as wired, wireless, cellular, radio, etc.

Memory unit 230 may store software instructions which may include one or more operating systems ("OS") 232, one or more applications ("apps") 234, and data 236. Processor 220 is configured to execute software instructions stored in memory unit 230 to communicate via network 120 and to carry out a number of operation processes and applications to realize functionality of client device 130. For example, client device 130 may execute software instructions that may be provided as a native application or app 234 to generate and display a user interface and/or content via display 210, which may be internal to or operably connected to client device 130. Applications 234 may enable not only the display of content and/or a user interface but may also enable client device 130 to communicate with application system 112 (FIG. 1) in order to receive additional content from and/or the provision of services with provider 110 (FIG. 1), such as mobile or online banking. Applications 234 may include software instructions for a wide range and number of applications or apps configured to run on operating system 232, including a native application associated with provider 110, an internet browser application, and/or a content player application. Operating system 232 includes one or more software instructions according to any platform suitable for controlling operation of client device 130 according to the disclosed embodiments.

In the disclosed embodiments, one or more of applications 234 may be realized as a native application, a web application, or a combination thereof. With respect to a native application, the software code may be developed for use on a particular client device 130 or according to a particular platform or operating system 232 controlling the functionality of client device 130. In an exemplary embodiment, a native application may be installed directly onto client device 130 and stored in memory unit 230. The native application may be retrieved or downloaded from an application distributor or directly from application system 112. In an exemplary embodiment, data and content associated with the native application may be stored in memory unit 230 as data 236. A web application, on the other hand, may be generalized for a number of platforms and may enable receipt of content that is stored at application system 112 via network 120 as opposed to being stored locally on client device 130. Web applications may be accessed using a separate web browser application and/or other native application stored on client device 130, which includes instructions for retrieving content from application system 112 via network 120. Applications 234 according to exemplary embodiments are not restricted to any particular configuration or label applied to the application, and are described herein according to their functionality.

Figure 3:
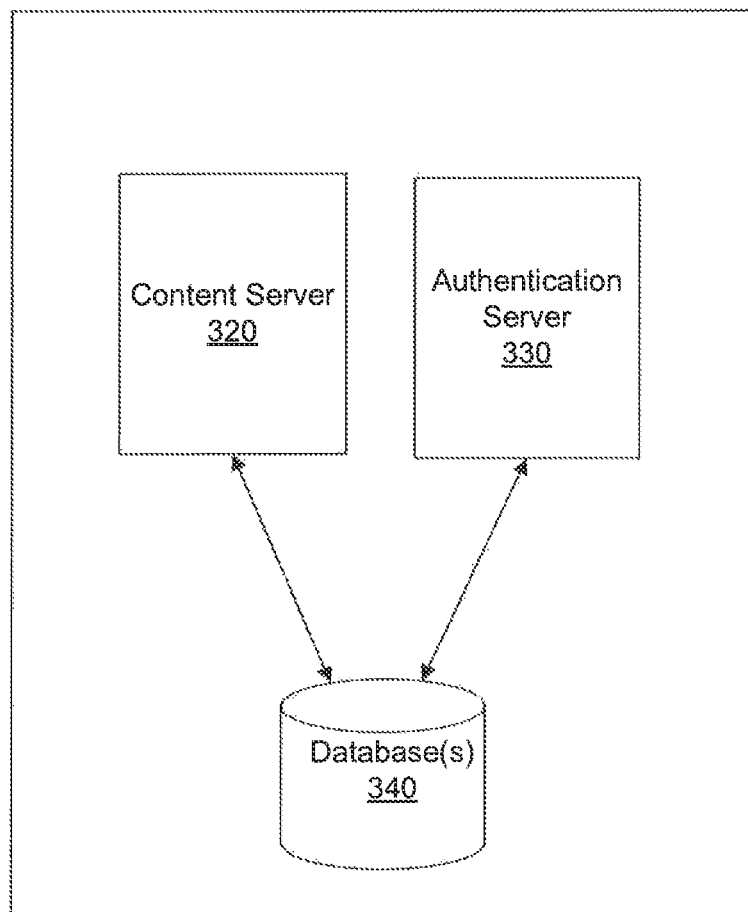
FIG. 3 is a block diagram of an exemplary application system, consistent with disclosed embodiments.

FIG. 3 shows an exemplary application system 112, a subsystem of provider 110, for implementing embodiments consistent with the present disclosure. Variations of application system 112 may be realized according to a particular provider 110. As shown in FIG. 3, in one embodiment, application system 112 may include a content server 320, an authentication server 330, and a database 340. According to some embodiments, content server 320 may comprise one or more web servers or similar computing devices that generate, maintain, and provide websites or web content consistent with disclosed embodiments. Content server 320 and authentication server 330 may further include one or more processors, one or more memories, and one or more interfaces for communicating with database 340 and network 120 (FIG. 1) and/or each other. Content server 320 and authentication server 330 may be any computing device capable of performing the desired functionality, such as a general purpose computer, a mainframe computer, or any combination of these components. Alternatively, content server 320 and authentication server 330 may be configured as a particular apparatus, embedded system, dedicated circuit, and the like based on the storage, execution, and/or implementation of the software instructions that perform one or more operations consistent with the disclosed embodiments.

Content server 320 and authentication server 330 may be standalone server units, or they may be part of a subsystem, which may be part of an even larger system. Each of the shown components need not be provided within a single location and may be widely distributed among various other systems or subsystems. For example, application system 112 may include distributed servers that are remotely located and communicate over a network (e.g., network 120), which may include a dedicated network such as a LAN. In some embodiments, the functionality of content server 320 and authentication server 330 may be encompassed in a single server or server system.

Content server 320 and authentication server 330 may also be communicatively connected to one or more database(s) 340. Database 340 may include one or more memory device(s) that store information, which may be accessed and/or managed through content server 320, authentication server 330, and/or other systems provided by provider 110. By way of example, database 340 may include Oracle™ databases, Sybase™ databases, or other relational databases or non-relational databases, such as Hadoop sequence files, HBase, or Cassandra. Databases 340 may include, for example, data and information related to the source and destination of a network request, multimedia content, web page content, user information etc. according to the disclosed embodiments. In some embodiments, database 340 may be located remotely from application system 112. Database 340 may include computing components (e.g., database management system, database server, etc.) configured to receive and process requests for data stored in memory devices of database 340 and to provide data from database 340.

Figure 4:
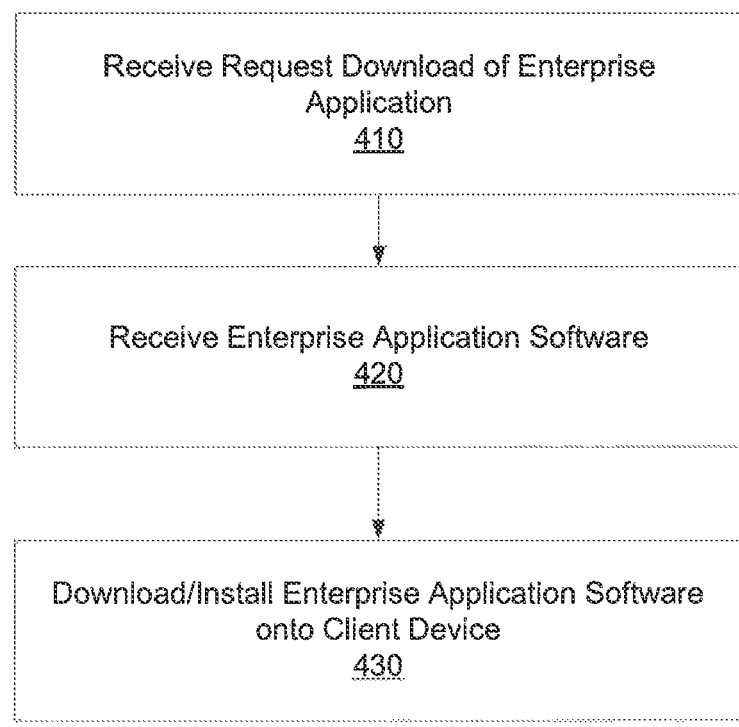
FIG. 4 is a flowchart of an exemplary application download process, consistent with disclosed embodiments.

As shown in FIG. 4, according to an exemplary embodiment, a native mobile application associated with provider 110 (FIG. 1) may be installed onto a client device 130 via application download process 400. In an exemplary embodiment, application system 112 may receive a request from client device 130 to download a native application to client device 130 (step 410). In one embodiment, application system 112 may receive the request from an application distributor navigated by user 132, 134 using a web browser application installed on client device 130 or any particular application installed on client device 130. In another embodiment, application system 112 may receive the request to download a native application associated with provider 110 onto client device 130 from a webpage or some other portal associated with a provider 110 accessed by user 132, 134 via, e.g., client device 130. In this embodiment, application system 112 may store software instructions corresponding to a native application in content server 320 and/or database 340. In one embodiment, application system 112 may receive additional information from client device 130 regarding the particular device specifications of client device 130 to enable client device 130 to download software instructions corresponding to its particular specifications. In yet another embodiment, application system 112 may push a download request link to client device 130 or transmit the software code corresponding to a native application directly to client device 130 in, for example, an e-mail, a text or short message service ("SMS") message, a prompt through an app, or other suitable method. In step 420, client device 130 may receive the native application software code, preferably via network 120, and downloads and installs the software code to be stored in memory unit 230 as one of applications 234 (step 430).

Figure 8A:
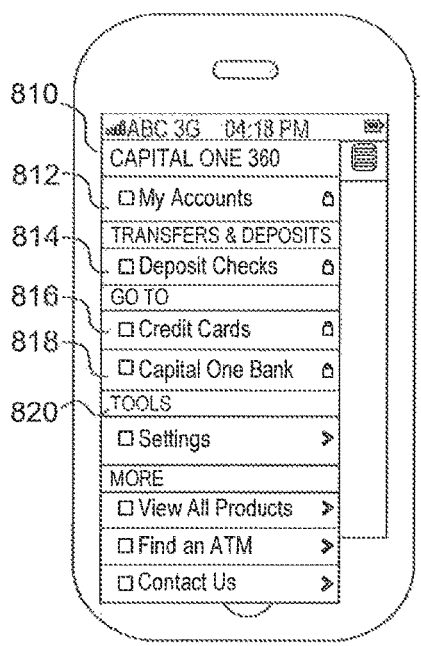
FIGS. 8A-8D are illustrations of exemplary user interfaces, consistent with disclosed embodiments.

In an exemplary embodiment, provider 110 includes a financial services provider, and the native application, once executed by processor 220 in client device 130, provides a user interface (such as shown in FIG. 8A-D) for receiving various financial services information and for performing various transactions with financial services provider 110. In one embodiment, a native application may include software code defining the content and placement of particular fields (e.g., text fields, input fields, graphic fields, icons, colors, etc.) and directing client device 130 to display a user interface of the native application according to the software code. For example, the native application software code includes instructions for generating a "standard" (i.e. non-beta) menu screen 810 and each of the displayed menu features and options as shown in FIG. 8A. In one embodiment, the native application software code also includes instructions to display additional information or graphics or to execute a process in response to a selection received from user 132 of any one of the menu features displayed. For example, one such process may include accessing, via network 120, additional information stored or generated by application system 112. Such process performed in response to receiving user 132's, 134's selection may include receiving personal financial information, such as the user's account balance from application system 112, and displaying such information within the native application interface. Therefore, according to the disclosed embodiments, the native application software code enables client device 130 to access to personal financial information stored on client device 130 and information retrieved remotely, such as from application system 112.

Figure 8B:
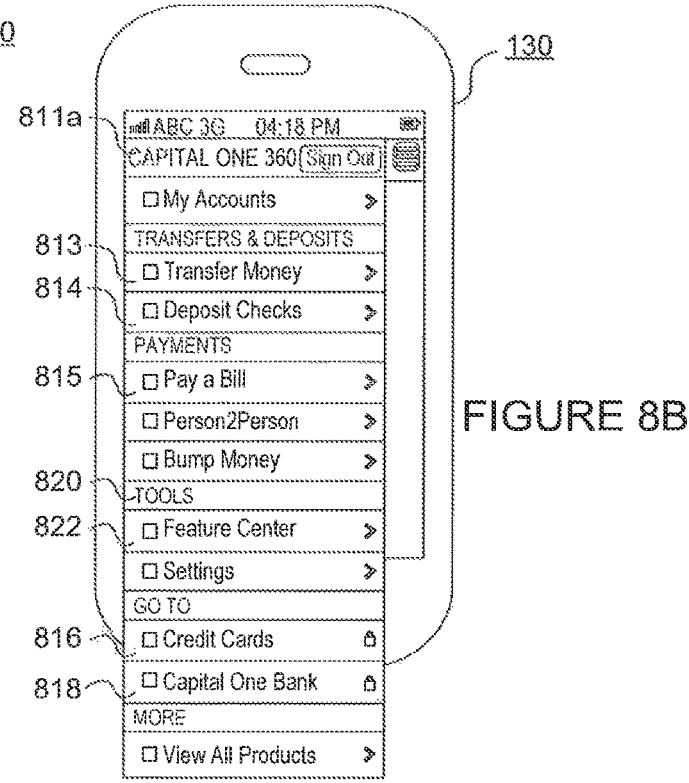

As shown in FIGS. 8A and 8B, an exemplary native application for a financial services provider 110, such as one of applications 234 executed on client device 130, may provide a user interface displaying a number of convenient features for improving a user's access to financial services. For example, as shown in menu 810, a user 132, 134 may access information concerning a particular account, such as a savings account offered by Capital One 360®, by selecting the "My Accounts" field 812. Additionally, a user 132, 134 may access another account, such as a credit card account or a checking account by selecting the "Credit Cards" field 816 or the "Capital One Bank" field 818, respectively. A number of other features or functionality may be realized as suggested by the remaining menu items. For example, the native application may enable user 132, 134 to transfer money by selecting field 813, deposit checks by selecting field 814, pay a bill by selecting field 815, etc. The particular features shown are provided only as an example, and are not limiting of any of the disclosed embodiments. Additionally, the disclosed embodiments are not limited to a particular design of a native application user interface. As such, the functionality of a native application may be realized by a user interface displaying one or more icons relating to particular features, or any other method desired by provider 110.

According to an exemplary embodiment, each user 132, 134 operating client device 130 may receive native application software code associated with a particular provider 110. Application system 112 may provide a single version of a native application available for download by any user 132, 134. While the visual appearance of the native application user interface may vary for some users 132, 134 depending on the specifications of client device 130, in one embodiment, a particular native application may contain substantially the same functionality for each client device 130, to the extent such functionality is not limited by the specifications of client device 130. In some embodiments, application system 112 may provide multiple versions of a native application, one for each of varying specifications for client devices 130. For example, one version of a native application may be provided for similarly functional smartphones, and another version of the native application may be provided for a smart television, and yet another version for a tablet.

The present disclosure provides systems, methods, and computer readable media for improving the delivery of content or the provisions of services to users 132, 134 when accessing and using a native application on client device 130. The functionality of a provider's 110 native application or app may be a significant factor toward increasing the total client base, thereby increasing revenue. As such, the present disclosure describes methods and systems to develop and test new functionality and new features ("beta features") for the native application to keep a user engaged with the app, as well as to increase the usability and convenience of the app. According to the present disclosure, provider 110 is enabled to test the real-time functionality, use, and desirability of beta features for a future version of the native app within an enrolled or current version of the native application before making the beta features available to all users 132 of the native application.

Figure 5:
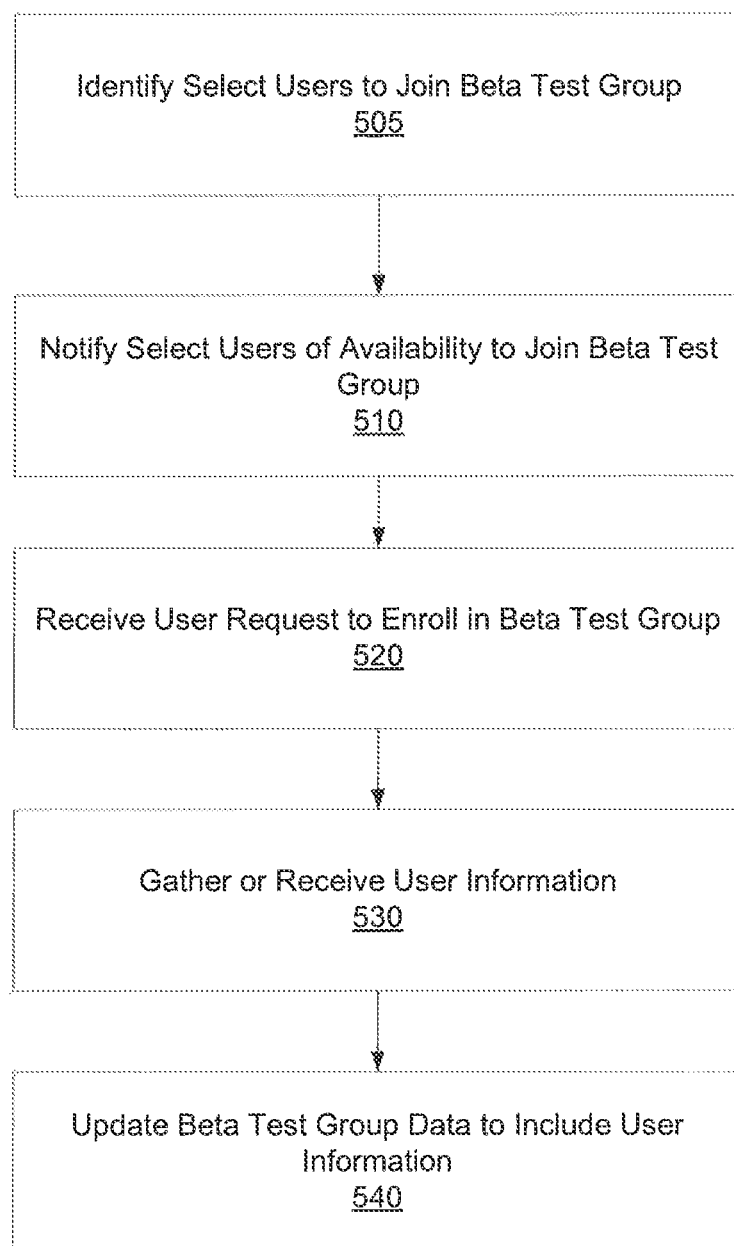
FIG. 5 is a flowchart of an exemplary beta user registration process, consistent with disclosed embodiments.

In FIG. 5, a method 500 is provided for identifying and enrolling a beta user 134 as a user of a beta test group according to some embodiments. In step 505, application system 112 identifies a select group of beta users 134 to test beta features of the native application. In one embodiment, the select group of beta users 134 is a subset of all users 132. The beta users 134 may be selected from a current group of customers of provider 110, or current users 132 of the native application provided by application system 112.

In one embodiment, application system 112 may select the beta users 134 according to any number of criteria. For example, the beta users 134 may be chosen from the most frequent users of a current version of the native application, or may be chosen based on particular demographics such as age, geographic location, net value of accounts, duration of being a customer, etc. In another embodiment, the beta users 134 may be determined from a random sample, or may be selected as a diverse group with little or no identifying characteristics. In yet another embodiment, application system 112 may seek interest from the general pool of users 132 to become one of beta users 134 without identifying any particular group of users. In the disclosed embodiments, a beta test group may include several hundred beta users 134 to several thousand beta users 134. A beta test group may, alternatively, contain more or less beta users 134. There is no artificial minimum or maximum on the number of beta users 134 that may be chosen to participate in a beta test group.

Application system 112 may notify the selected users of their ability to join a beta test group (step 510) according to any effective method for providing notices or communications to select users. For example, application system 112 may communicate with prospective beta users 134 via e-mail or text message, or upon the selected user accessing their account associated with the provider 110, either online or through a native application of application system 112 via client device 130. In another embodiment, a link may be provided to the prospective beta users 134, directing them to a webpage or portal or the like, which enables the beta user 134 to participate in an enrollment or pre-registration process to join a beta test group. In another embodiment, the prospective beta users 134 may be requested to reply to any particular method of communication to enroll in a beta test group. Once application system 112 receives a user agreement to enroll in a beta test group (step 520), via, e.g., client device 130, application system 112 may receive user information from the enrolling beta user 134 (step 530). User information may include a username, login identifier, account number, or any other credential or identifier used by application system 112 to identify a user 132,134. In another embodiment, application system 112 may gather user information regarding the enrolling beta user 134 from information stored, for example, in database 340. After obtaining information concerning the enrolling beta user 134, application system 112 may update beta test group data stored, for example, in database 340 to include the enrolling beta user's 134 information (step 540). Application system 112 may store a record or log, such as in database 340 or in authentication server 330 (FIG. 3), including identifying information for each beta user 134 enrolled in a beta test group. In another embodiment, application system 112 may update user identification records stored in database 340 with, for example, a flag or other indicator identifying the beta user 134 as enrolled in one or more beta test groups.

In another embodiment, steps 510 and 520 of beta user registration process 500 may be omitted. For example, application system 112 may automatically enroll one or more of select users identified in step 505 in a beta test group. In this embodiment, application system 112 may enroll select beta users 134 without notifying the user. Application system 112 may gather user information (step 530) regarding the select beta users 134 from information previously received or stored by application system 112.

According to one embodiment, a single beta test group may be chosen to test all available beta features of a native application. As such, every beta user 134 may be enabled to test all beta features planned for the native application. In another embodiment, there may be more than one beta test group. For example, there may be a first beta test group for testing a first beta feature of the native application, and a second beta test group for testing a second and different beta feature of the native application. Additionally, there may be one or more combinations of beta test groups associated with one or more beta features or groups of beta features. In the exemplary embodiments, application system 112 may store identifying information for each beta user 134, including an indication of one or more beta test groups in which the beta user 134 is selected to participate. In some embodiments, identification information for each beta user 134 may correspond to information associated with client device 130, such as a device serial number, a network identifier, or any other indicia for identifying client device 130.

Once provider 110 or application system 112 enrolls a beta user 134 in a beta test group according to registration process 500, for example, that beta user 134 may be enabled to access new beta features of an exemplary native application according to application process 600 (FIG. 6) executed by client device 130. Prior to beginning application process 600, a beta user 134 may have completed the application download process 400. The latest, most recent, or most current version of the native application software may have been installed onto client device 130. According to an exemplary embodiment, the version of the native application software that has been installed onto client device 130 of a beta user 134 may be the same version installed on client devices of other users 132 that are not part of a beta test group. According to this embodiment, beta features may be made available to beta users 134 within the native application. As such, a beta user 134 may not be required to download and install a different version or a separate, beta version of the exemplary native application specifically to test the beta features. As discussed in detail below, the native application software provided to all users 132 may include "hidden" code defining the beta features or functionality and defining an interface to access the beta features. The "hidden" code may be "activated" or executed by client device 130 upon receipt of a signal from application system 112, indicating that the particular user associated with client device 130 is a member of a beta test group (i.e., a beta user 134).

Figure 6:
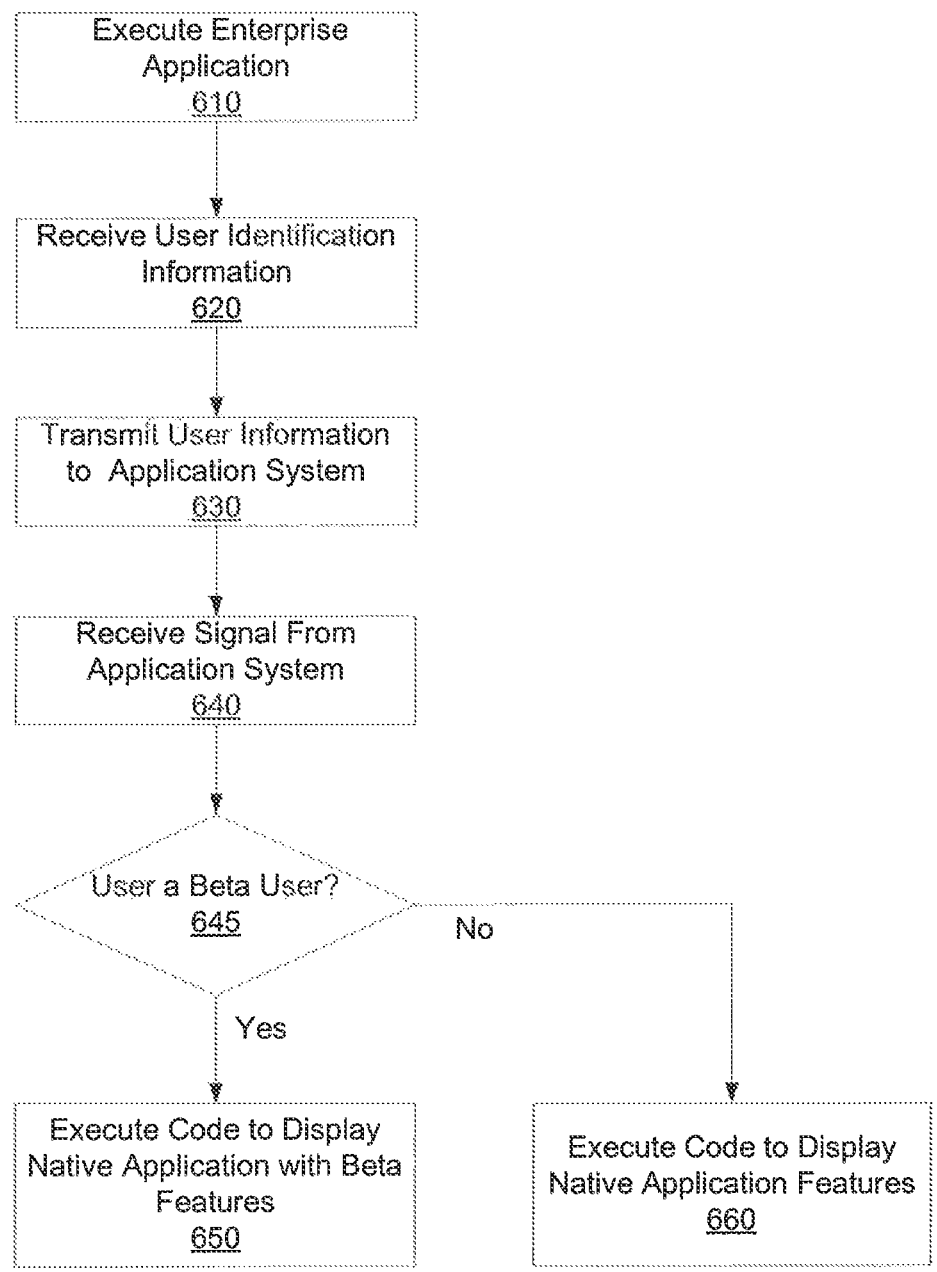
FIG. 6 is a flowchart of an exemplary client device application process, consistent with disclosed embodiments.

FIG. 6 shows an exemplary application process 600 according to the disclosed embodiments. According to process 600, a user 132 or 134 may execute a native application via client device 130 (step 610). A user 132 or 134 may execute the native application by selecting an icon corresponding to the native application by any input means available for client device 130 or by any other method. As discussed in detail above, an exemplary native application may be one of several applications 234 installed in memory unit 230 of client device 130. Upon execution of the native application, processor 220 (FIG. 2) may execute native application software to display a user interface via display 210. In an exemplary embodiment, the native application may display a user login screen requesting login credentials or other identifying information from user 132 or 134 for authenticating the user to receive specific content or services. In such an embodiment, user 132 or 134 may enter or otherwise provide the requested login information (step 620), such as via input device 212. In another embodiment, a native application may retrieve user identification information, such as information stored as data 236 in memory unit 230, without requiring user input. In yet another embodiment, user identification information may correspond to identification information associated with client device 130 as opposed to user 132 or 134. In such an embodiment, the native application may not require any user authentication procedure.

Upon receiving or retrieving user identification information (step 620), client device 130 executing the native application may transmit the user information to application system 112 (step 630) via network 120 utilizing communication unit 214.

Figure 7:
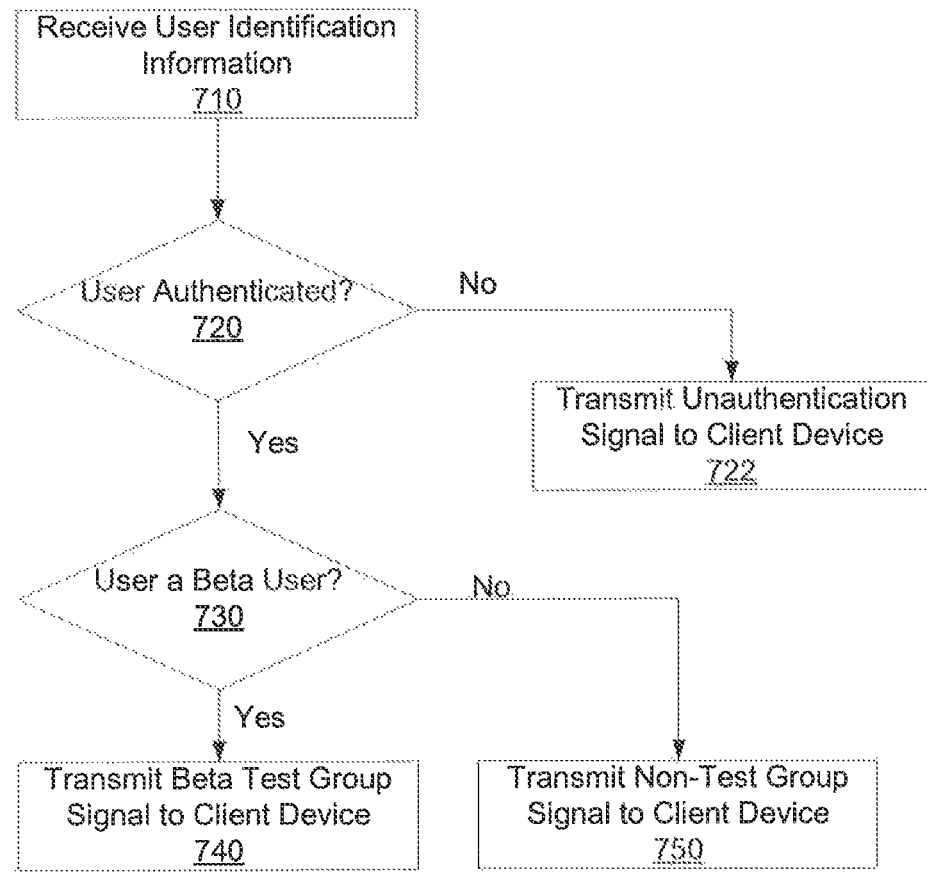
FIG. 7 is a flowchart of an exemplary beta user identification process, consistent with disclosed embodiments.

Referring now to FIG. 7, illustrating an exemplary beta user identification process 700, application system 112 may receive the transmitted user identification information (step 710) from client device 130 via network 120. Application system 112, via authentication server 330, for example, may determine whether the user 132,134 is authorized to access content or receive a service (step 720). In one embodiment, the native application enables access, e.g., by client device 130, to user-specific financial information stored at or accessible by application system 112. In such an embodiment, application system 112 may determine whether the received user identification information corresponds to an authorized user. For example, authentication server 330 may receive user identification information and compare such information to other data stored by authentication server 330 or database 340. If authentication server 330 determines that user identification information does not correspond to an authorized user (step 720; NO), then application system 112 may transmit an un-authentication signal to client device 130 (step 722) indicating that the particular user 132, 134 is unable to be authenticated by application system 112. According to some embodiments, the native application does not require or desire user authentication, and step 720 may be omitted.

If user authentication is required and user 132, 134 is authenticated (step 720; YES), application system 112 may determine whether the user is a beta user 134 (step 730), as discussed above. The determination in step 730 may be performed by authentication server 330, content server 320, or any other appropriate means. In an exemplary embodiment, application system 112 may compare user identification information received from client device 130 with a beta test group record identifying enrolled beta users 134. Additionally or alternatively, application system 112 may inspect a record corresponding to the identified user and determine whether that user is "flagged" as a beta user 134 or whether the user record includes any indicia indicating that user is a beta user 134. As discussed above, in an alternative embodiment where user identification information corresponds to identification information of client device 130, determination as to whether the client device 130 is part of a beta test group may be performed in a similar manner. In the exemplary embodiments, if application system 112 has established more than one beta test group, application system 112 may determine each beta test group in which the beta user 134 or client device 130 is indicated as being a member.

Application system 112 may also transmit a signal to client device 130, including information indicating whether the client device 130 or user belongs to a beta test group. In an exemplary embodiment, the signal transmitted by application system 112 may be according to the specification of any network 120 or combinations of networks. If the user or client device 130 is a member of a beta test group (step 730; YES), application system 112 transmits a beta test group signal to client device including information indicating the one or more beta test groups to which the beta user 134 or client device 130 belongs (step 740). If a user 132 or client device 130 has not been previously enrolled as a beta test group member (step 730; NO), then application system 112 transmits a non-test group signal to client device (step 750). In one embodiment, application system 112 may also include authentication information as part of the signal transmitted in step 740 or 750, if authentication is required.

Returning back to FIG. 6, client device 130 may receive the signal transmitted in step 740 or 750 via network 120 and communication unit 214 (step 640). Processor 220 may be configured to process the received signal and to perform a next process under the instructions of the native application software and according to the received signal or signals. In step 640, client device 130 may determine whether the received signal includes any beta test group information. If the received signal includes beta test group information (step 645; YES), the native application may display a user interface that enables beta user 134 to access one or more new beta features (step 650). For example, as shown in FIG. 8B, a beta test menu 811*a* may be made visible only for beta users 134. In one embodiment, beta test menu 811*a* may include an additional menu item or field such as the "Feature Center" field 822 displayed under "Tools" heading 820. As compared to a menu 810 in FIG. 8A that is displayed to non-beta users 132, beta test menu 811*a* shown in FIG. 8B enables a beta user 134 to access beta features of the native application by selecting the "Feature Center" field 822. If client device 130 determines that the received signal from application system 112 does not include beta test group information (step 645; NO), client device 130 may execute the native application software instructions for displaying a "standard" non-beta test menu 810 (step 660) that does not include access to "Feature Center" field 822, for example.

In another embodiment, beta test group information may be stored at client device 130 once received from application system 112 according to the above embodiments. Thus, after receiving a signal from application system 112 for the first time in step 640, client device 130 may store the received beta test group information in memory 230, for example, to be accessed each subsequent time a user 132 or 134 executes the native application. In another embodiment, a native application may also include software instructions to modify itself upon receipt of a first signal from application system 112 in step 640 to automatically display a beta test group interface, such as beta test menu 811*a*, upon each subsequent execution of the native application at client device 130. Thus, beta features may be made available to beta user 134 without receiving beta test group information from application system 112 or without retrieving such information from memory unit 230, for example.

In yet another embodiment, steps 620, 630, and 640 may be omitted or performed at another time, such as during the native application download process 400. For example, prior to or as part of requesting download of a native application (step 410), a user 132, 134, via, e.g., client device 130, may provide identification information to application system 112. During that process, application system 112 may determine whether the user and/or client device 130 is enrolled in a beta test group in a manner that may be similar to step 730 (FIG. 7). If it is determined that the user or client device 130 is enrolled in a beta test group, application system 112 may provide additional beta test group information along with the native application software for installation at client device 130. As such, the installed native application may include instructions for executing code for displaying a beta test menu 811*a*, such as shown in FIG. 8B, upon execution of the native application. Accordingly, in one embodiment, a beta user 134 may be able to access beta features in the native application without specifically receiving a signal from application system 112 upon execution of the native application.

In an alternative embodiment, upon application system 112 identifying a user as a beta user 134 (step 730; YES), application system 112 may transmit or push to client device 130 additional code corresponding to beta functionality instead of or together with beta test group information (step 740). For example, application system 112 may transmit executable code or instructions that when processed by processor 220 may enable beta functionality within the native application for a beta user 134. The additional code may include instructions for displaying "Feature Center" field 822 or other beta features, as discussed below.

Figure 8C:
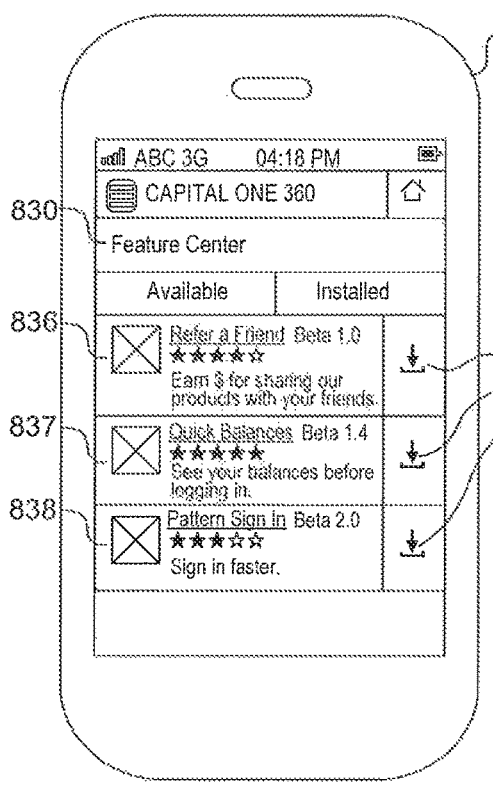

In some embodiments, as shown in FIGS. 8B and 8C, a beta user 134 may be enabled to access and test new beta features by selecting "Feature Center" field 822. Upon selecting "Feature Center" field 822, the native application may instruct processor 220 to display a subsequent menu screen 830 corresponding to the Feature Center, as shown in FIG. 8C. The code for displaying the subsequent menu screen 830 may be provided or received as part of the native application. As shown in FIG. 8C, a number of beta features such as features 836, 837, and 838 may be made available to a beta user 134 for beta testing. Beta user 134 may then select a download/install icon 839 corresponding to each beta feature displayed to install that particular feature to client device 130. In one embodiment, software code corresponding to a particular beta feature, such as feature 836, may be received by client device 130 together with the native application during the download process, such as during step 420 (FIG. 4). As such, each beta feature may already be stored at client device 130 prior to selecting download/install icon 839. In an alternative embodiment, upon selecting download/install icon 839 corresponding to a particular beta feature, beta user 134 may be directed to subsequently receive and download software code for the beta feature from application system 112 in a manner similar to application download process 400.

According to the exemplary embodiments, the beta features may include any particular functionality that provider 110 desires to provide users 132, 134 of its native application. For example, as shown in FIG. 8C, one such beta feature may correspond to a "Refer a Friend" feature 836. In one embodiment, "Refer a Friend" feature 836 enables a user 132, 134 of the native application to recommend the native application to another friend. Beta features 836, 837, and 838 may enable new transactions or operations, and in the disclosed embodiments, such beta features are fully workable within the native application.

In one embodiment, application system 112 can dynamically control which beta features within the Feature Center menu 830 are made available, if at all, to select groups of beta users 134. For example, application system 112 may form a number of beta test groups for testing particular beta features of the native application. In this embodiment, application system 112 in step 740 (FIG. 7) may include such group information indicating the one or more beta test subgroups to which the beta user 134 or client device 130 belongs. As such, the native application executed at client device 130 may execute specific software code directed only to the one or more beta features designated for a particular beta test group according to the received beta test group information. For example, a particular beta user may not be able to access or view every beta feature contemplated by application system 112. As such, upon accessing the Feature Center shown in screen 830 (FIG. 8C), only select beta features may be made available for a particular beta user 134 to install on client device 130 according to received beta test group information.

In another embodiment, application system 112 may dynamically update or add new beta features accessible via a Feature Center menu 830 for any particular beta test group. According to this embodiment, Feature Center menu 830 may provide access to beta features stored at application system 112, for example, via one or more links to the beta features. In one embodiment, the one or more links may correspond to a storage location enabling a beta user 134 to receive and download software code for the beta feature from application system 112. In another embodiment, the one or more links may direct a beta user 134 to a mobile web page providing access to one or more beta features, as discussed below.

In yet another embodiment, Feature Center menu 830 may be provided as a mobile web page that is accessible within the native application. As such, a beta user 134 may be redirected within the native application to an internet web page, such as a mobile web page, upon selecting the "Feature Center" field 822. In this embodiment, the mobile web page may be provided by content server 320 of application system 112. Application system 112 may then dynamically add or update any number of beta features which are made accessible to beta user 134 through such a mobile web page. Beta user 134 may then be able to select (via, e.g., client device 130) which of the new beta features it desires to install onto client device 130 according to the above embodiments. For example, upon selecting a download/install icon 839, client device 130 may receive software corresponding to the selected feature for download similar to application download process 400 (FIG. 4).

In another embodiment, all users 132, 134 of a native application may have access to the Feature Center menu 830 within the native application, however, only beta users 134 may be able to see and/or select one or more beta features. For example, a Feature Center according to the alternative embodiment may include a number of features, some of which are beta features made available only to beta users 134. In such an embodiment, the native application may direct non-beta users 132 to a first Feature Center displaying features available for all users, whereas beta users 134 may be directed to a second Feature Center displaying additional beta features. The separate first and second Feature Centers may be individual mobile web pages accessible within the native application, similar to the above embodiment. In this embodiment, the native application may direct a beta user 134 to the second Feature Center web page according to beta test group information received from application center 112, such as according to steps 640 and 740 (FIGS. 6 and 7, respectively).

In yet another embodiment, application system 112 may transmit or push additional software code or instructions corresponding to new beta features to client device 130. Application system 112 may push the additional code to a select group of beta users 134 or all beta users 134. The additional beta feature code may be transmitted to client device 130 of a beta user 134 upon executing the native application at client device 130. Alternatively, application system 112 may transmit new beta feature code to beta users 134 on a scheduled release or at any desired time for releasing new beta functionality to beat users 134. For example, application system 112 may transmit executable code or instructions that when processed by processor 220 enable a beta user 134 to execute the beta features and functionality. The additional code may include instructions for displaying the beta feature in beta feature screen 830, as shown in FIG. 8C, corresponding to the Feature Center. The additional code may also include instructions enabling functionality of the new beta feature upon installation of the beta feature in the manner discussed above.

Figure 8D:
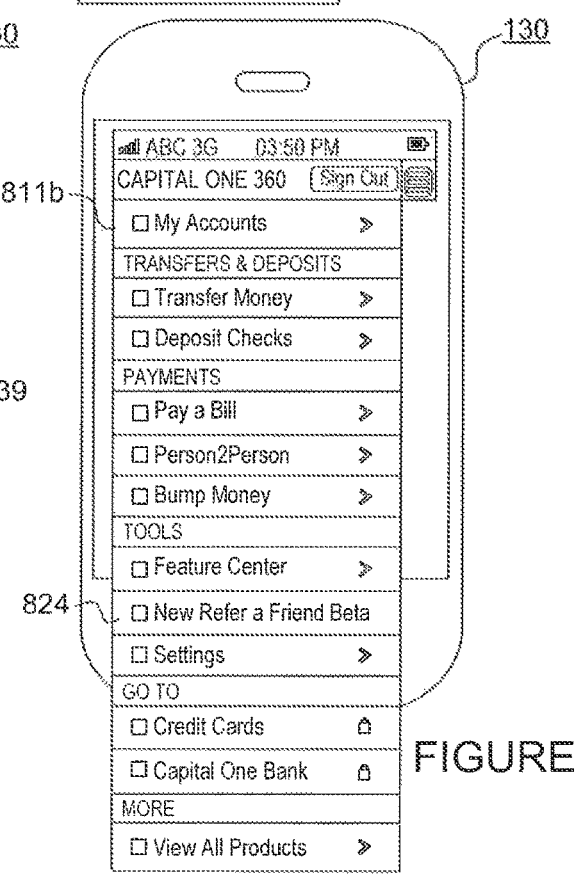

Upon installing a beta feature, such as 836, 837, or 838, at client device 130, according to any of the above embodiments, a native application may be configured to display the installed beta feature within a user interface such as shown in menu 811b in FIG. 8D. Interface menu 811b may be substantially the same as the beta test menu 811a (FIG. 8B), except it may provide one or more new fields within the native application interface corresponding to the installed one or more beta features, such as field 824 corresponding to an installed "Refer a Friend" beta feature 836, by way of example. The exemplary embodiments are advantageous at least because a beta feature can be tested in real-time, or substantially real-time, as part of an interface as would be implemented in a full rollout of the feature within a native application made available for all users 132,134. For example, a beta user 134 can now access and test "Refer a Friend" beta feature 836 as it would any other feature available in the standard version of the native application available for all other users 132. Furthermore, beta user 134 is not required to download a new beta version of the native application in order to test a beta feature. Additionally, beta user 134 is enabled to choose to install only those beta features that it may find desirable and uninstall any beta feature it does not desire, such as by selecting an uninstall icon 904 shown in FIG. 9A. Accordingly, the overall beta test experience for a beta user 134 is more closely simulated to a regular user experience and is more convenient for the beta user 134, thus resulting in improved beta testing metrics.

Figure 9A:
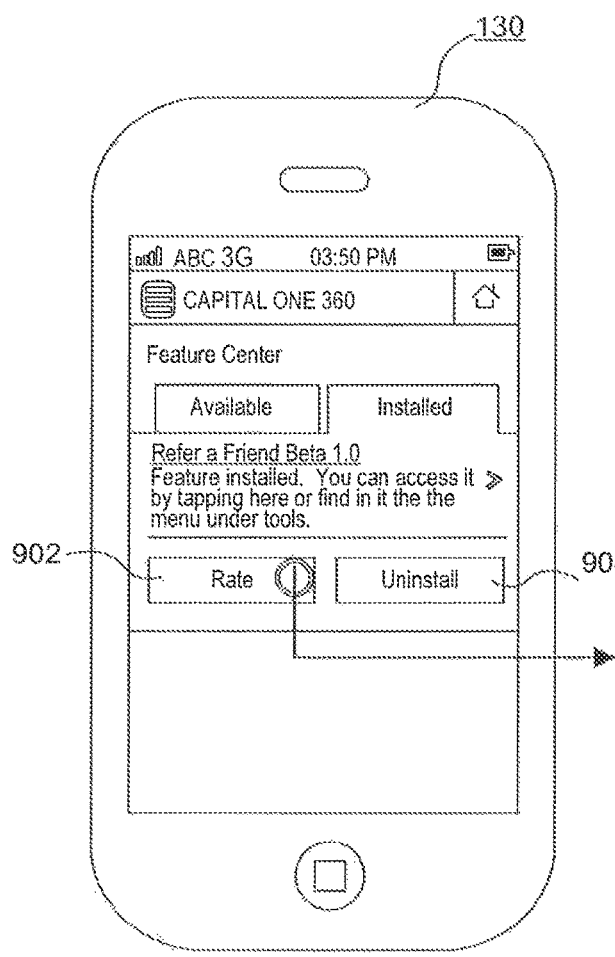
FIGS. 9A and 9B are illustrations of an exemplary rating interface, consistent with disclosed embodiments.
Figure 9B:
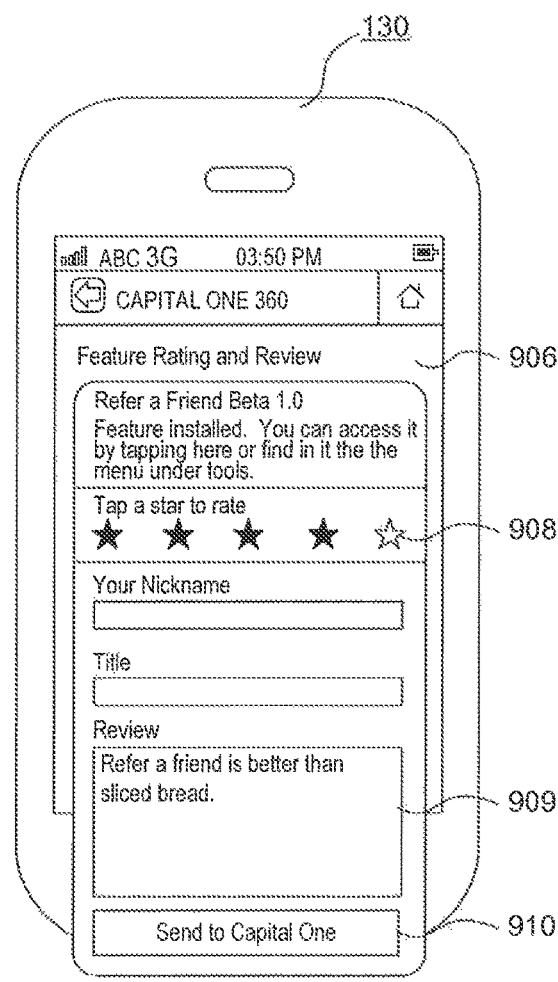

According to the exemplary embodiments, beta testing results may be received (by, for example, application system 112) as feedback from beta users 134 and/or from analytics or metrics captured in the background regarding how the particular beta user 134 uses a beta feature. In one embodiment, as shown in FIGS. 9A and 9B, once a new beta feature is installed to client device 130, the native application enables beta user 134 to rate the beta feature and provide specific comments concerning the beta feature and its interaction with the native application. For example, a beta user 134 may be able to rate an installed beta feature by selecting a rate icon 902 within the Feature Center, as shown in FIG. 9A. Alternatively, a rating icon or interface may be displayed upon accessing the beta feature itself. Upon selecting rate icon 902, beta user 134 may be directed to a second screen 906, as shown in FIG. 9B, providing an interface for rating the beta feature. For example, a beta user 134 may be able to rate the "Refer a Friend" beta feature 836 on a particular number or other scale such as a star scale shown in field 908. Additionally, beta user 134 may be prompted to enter more detailed rating or review information such as via field 909. Upon completion of its review, beta user 134 may transmit the rating and review information to application system 112 such as by selecting a send icon 910. In one embodiment, beta user 134 may be prompted to rate or review a particular beta feature immediately after utilizing the beta feature or a particular aspect of the beta feature. Additionally, in another embodiment, the native application may provide a rating section or rating icon for each particular aspect of a beta feature, such as regarding visual aesthetics, ease of use, ways to improve, desirability of the feature, etc. The rating section may be displayed on each screen or interface viewed within the beta feature or native application as desired. In one embodiment, a beta user 134 may be encouraged to rate a particular beta feature by incentivizing them with the prospect of being granted access to additional beta features, more favorable account terms (such as a higher interest rate on savings account, lower interest rates on credit cards, etc.), or other incentives.

In one embodiment, analytics and metrics may also be captured in real-time (or substantially real-time) based on a beta user's 134 use of a particular beta feature or standard feature, and automatically uploaded or sent to application system 112. For example, any number of analytics or metrics may be captured in real-time, such as the length of time it takes a beta user 134 to execute a process, the number and frequency of interactions with the beta feature, how often a beta user 134 may request additional assistance from provider 110, when a beta user 134 exits the feature or the native application, and whether inclusion of the beta feature results in increased interaction with other features of the native application, etc. The particular analytics that may be analyzed are limitless and are not limiting of the exemplary embodiments. According to the exemplary embodiments, the gathered analytics may be compared to other non-beta users 132 and other beta users 134. The comparisons may then be analyzed in a number of ways as desired. For example, the compared analytics may enable provider 110 or application system 112 to determine and report statistics indicating whether the beta features and functionality improve or increase user engagement with the native application based on, for example, the number of interactions with a feature of a particular user pre- and post-installation of the beta features, the number of user interactions with one or more features between distinct beta and non-beta users, etc.

Additionally, application system 112 may prompt a beta user 134 to provide additional information concerning its use of the particular beta feature or the native application if it identifies a particular pattern of behavior. For example, if a beta user 134 frequently exits the native application without completing a process within the application or a beta feature, application system 112 may prompt beta user 134 to explain those actions. Such prompt may be displayed to beta user 134 within the native application itself, by e-mail, or any other suitable method.

Application system 112 may be capable of sorting the received ratings and reviews and all other gathered analytics and metrics concerning a beta user's 134 use of a particular beta feature or the native application. Application system 112 may then use this information to improve a beta feature before making it available to all other users 132, if desirable. In some embodiments, a beta feature may be updated and then provided to a new group of beta users 134 to test the updated functionality of such beta feature. Each new beta feature may be frequently updated and provided to new beta users 134, if desired, until the beta feature is ready to implement to all other users 132 of the native application. Such beta testing processes may enable application system 112 to rapidly implement compelling new features and improve current features to maintain a positive customer experience with the native application.

The above embodiments are not limited to any particular operating system or platform. Each of the above embodiments may be realized by implementing any software development kit available for any particular operating system or platform. Although embodiments may be implemented as computer processing instructions, all or a portion of the functionality of disclosed embodiments may be implemented instead in electronics hardware. Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for identifying and enrolling a plurality of users into at least one test group, the system comprising:
   at least one memory device storing instructions; and
   at least one processor in communication with at least one database, the at least one processor being configured to execute the instructions to:
   provide a native application configured to be hosted at a client device, the native application comprising a non-beta feature set and a beta feature set, the beta feature set comprising new beta features or updated beta versions of non-beta features of the beta feature set;

enroll a first user of the plurality of users in a first test group and a second user of the plurality of users in a second test group, the at least one test group to test features of a native application executed by a client device;

wherein the first test group is associated with testing first beta features of the beta feature set, and the second test group is associated with testing second beta features of the beta feature set that are different from the first beta features;

enable, based on the enrollment, the first user to access the first beta features such that the first user is enabled to access the non-beta feature set and the first beta feature via a first instance of the native application executing on a first client device of the first user; and enable, based on the enrollment, the second user to access the second features such that the second user is enabled to access the non-beta feature set and the second beta feature via a second instance of the native application executing on a second client device of the second user, wherein the first and second instances of the native application are a same version of the native application.

2. The system of claim 1 wherein the at least one processor is further configured to store test group identification information for the users.

3. The system of claim 1 wherein the at least one processor is further configured to send a communication signal to the first client device including the test group identification information for a user associated with the first client device.

4. The system of claim 1 wherein the test group identification information includes an indication that indicates whether the user is enrolled in the first test group or the second test group.

5. The system of claim 1 wherein the test group identification information further includes an indication that indicates whether the user is a member or a non-member of the first test group.

6. The system of claim 1 wherein the at least one processor is further configured to receive a request from the first client device to download the native application to the first client device.

7. The system of claim 1 wherein the at least one processor is further configured to dynamically update a current feature or add at least one new feature to the first test group.

8. A non-transitory computer-readable medium storing instructions executable by at least one processor to perform operations for identifying and enrolling a plurality of users as users into at least one test group, the operations comprising:

providing a native application configured to be hosted at a client device, the native application comprising a non-beta feature set and a beta feature set, the beta feature set comprising new beta features or updated beta versions of non-beta features of the beta feature set;

enrolling a first user of, by the at least one processor, the plurality of users in a first test group and a second user of the plurality of users in a second test group, the at least one test group to test features of a native application executed by a client device;

wherein the a first test group is associated with testing first beta features of the beta feature set, and the second test group is associated with testing second beta features of the beta feature set that are different from the first beta features; and enabling, based on the enrollment, first user to access the first beta features such that the first user is enabled to access the non-beta feature set and the first beta feature via a first instance of the native application executing on a first client device of the first user; and enabling, based on the enrollment, the second user to access the second features such that the second user is enabled to access the non-beta feature set and the second beta feature via a second instance of the native application executing on a second client device of the second user, wherein the first and second instances of the native application are a same version of the native application.

9. The non-transitory computer-readable medium of claim 8, the operations further comprising, storing test group identification information for the users.

10. The non-transitory computer-readable medium of claim 8, the operations further comprising, sending a communication signal to the first client device including the test group identification information for a user associated with the first client device.

11. A method for identifying and enrolling a plurality of users into at least one test group, the method comprising:

storing feature information indicating test features of the application, the test features being configured in the application as features to be tested by users enrolled in a test group;

enrolling a first user in a first test group and a second user in a second test group, wherein the first test group is associated with testing at least a first test feature of the test features, and the second test group is associated with testing at least a second test feature of the test features that is different from the first test feature;

enabling, based on the enrollment, the first user to access the first test feature such that the first user is enabled to access the first test feature via a first instance of the application executing on a first client device of the first user; and enabling, based on the enrollment, the second user to access the second test feature such that the second user is enabled to access the second test feature via a second instance of the application executing on a second client device of the second user.

12. The method of claim 11, further comprising storing test group identification information for the users.

13. The method of claim 12, further comprising sending a communication signal to the first client device including the test group identification information for a user associated with the first client device.

14. The system of claim 12, wherein the test group identification information includes an indication that indicates whether the user is enrolled in the first test group or the second test group.

15. The system of claim 12, wherein the test group identification information further includes an indication that indicates whether the user is a member or a non-member of the first test group.

16. The method of claim 11, further comprising receiving a request from the first client device to download the native application to the first client device.

17. The method of claim 11, further comprising dynamically updating a current feature or add at least one new feature to the first test group.

* * * * *